United States Patent
Saeed et al.

(10) Patent No.: US 11,824,977 B2
(45) Date of Patent: Nov. 21, 2023

(54) DATA PROCESSING SYSTEM AND METHOD

(71) Applicant: Arm Limited, Cambridge (GB)

(72) Inventors: Sharjeel Saeed, Cambridge (GB);
Daren Croxford, Swaffham Prior (GB);
Dominic Hugo Symes, Cambridge (GB)

(73) Assignee: Arm Limited, Cambridge (GB)

( * ) Notice: Subject to any disclaimer, the term of this patent is extended or adjusted under 35 U.S.C. 154(b) by 399 days.

(21) Appl. No.: 16/940,770

(22) Filed: Jul. 28, 2020

(65) Prior Publication Data
US 2022/0038270 A1    Feb. 3, 2022

(51) Int. Cl.
H04L 9/08     (2006.01)
G06N 3/045    (2023.01)
G06N 3/08     (2023.01)
H04L 9/32     (2006.01)

(52) U.S. Cl.
CPC .......... H04L 9/0861 (2013.01); G06N 3/045 (2023.01); G06N 3/08 (2013.01); H04L 9/3247 (2013.01)

(58) Field of Classification Search
CPC ... H04L 9/0861; H04L 9/3247; G06N 3/0454; G06N 3/08
See application file for complete search history.

(56) References Cited

U.S. PATENT DOCUMENTS

| | | | |
|---|---|---|---|
| 10,210,860 B1* | 2/2019 | Ward | G10L 25/18 |
| 10,545,559 B2 | 1/2020 | Croxford | |
| 10,706,349 B2* | 7/2020 | Mody | G06N 3/088 |
| 10,956,584 B1* | 3/2021 | Heaton | G06F 21/602 |
| 11,663,107 B2* | 5/2023 | Rosemarine | G06F 18/24143 714/1 |
| 2009/0279145 A1* | 11/2009 | Tse | H04N 1/646 358/426.01 |
| 2017/0024641 A1* | 1/2017 | Wierzynski | G06N 3/045 |
| 2019/0147337 A1* | 5/2019 | Yang | G06N 3/08 706/25 |
| 2019/0180038 A1* | 6/2019 | Muppalla | G09C 5/00 |
| 2019/0273509 A1* | 9/2019 | Elkind | H03M 7/4093 |
| 2019/0273510 A1* | 9/2019 | Elkind | G06F 21/562 |
| 2019/0294959 A1* | 9/2019 | Vantrease | G06N 3/063 |
| 2019/0294968 A1* | 9/2019 | Vantrease | G06N 3/08 |
| 2020/0213343 A1* | 7/2020 | Bharrat | G06N 3/045 |
| 2020/0233979 A1* | 7/2020 | Tahmasebi Maraghoosh | G06N 3/08 |
| 2020/0279358 A1* | 9/2020 | Li | G06V 10/764 |
| 2020/0301739 A1* | 9/2020 | Xu | G06N 3/063 |
| 2020/0304804 A1* | 9/2020 | Habibian | H04N 19/90 |
| 2020/0336344 A1* | 10/2020 | Govea | G06N 3/08 |
| 2021/0065000 A1* | 3/2021 | Song | G06F 8/71 |
| 2021/0073393 A1* | 3/2021 | Jacobson | G06F 21/602 |

(Continued)

Primary Examiner — Gary S Gracia
(74) Attorney, Agent, or Firm — EIP US LLP

(57) ABSTRACT

A data processing system including storage. The data processing system also includes at least one processor to generate output data using at least a portion of a first neural network layer and generate a key associated with at least the portion of the first neural network layer. The at least one processor is further operable to obtain the key from the storage and obtain a version of the output data for input into a second neural network layer. Using the key, the at least one processor is further operable to determine whether the version of the output data differs from the output data.

20 Claims, 9 Drawing Sheets

(56) References Cited

U.S. PATENT DOCUMENTS

| | | | |
|---|---|---|---|
| 2021/0133455 A1* | 5/2021 | Selim | G16H 50/20 |
| 2021/0133959 A1* | 5/2021 | Selim | G06T 7/0012 |
| 2021/0134438 A1* | 5/2021 | Selim | G16H 50/20 |
| 2021/0134439 A1* | 5/2021 | Selim | G06T 7/0012 |
| 2021/0168195 A1* | 6/2021 | O | G06N 3/045 |
| 2021/0174137 A1* | 6/2021 | Kim | G06F 18/285 |
| 2021/0182660 A1* | 6/2021 | Amirguliyev | G06N 3/084 |
| 2021/0182661 A1* | 6/2021 | Li | H04L 41/16 |
| 2021/0182670 A1* | 6/2021 | Kim | G06N 3/0454 |
| 2021/0295138 A1* | 9/2021 | Symes | G06N 3/04 |
| 2021/0303974 A1* | 9/2021 | Saeed | G06N 3/0454 |
| 2021/0319270 A1* | 10/2021 | Qu | G06F 18/217 |
| 2022/0101063 A1* | 3/2022 | Chau | G06F 18/213 |
| 2022/0284469 A1* | 9/2022 | McCartney | H04L 63/123 |

* cited by examiner

DATA PROCESSING SYSTEM AND METHOD

BACKGROUND OF THE INVENTION

Field of the Invention

The present disclosure relates to a data processing system and method.

Description of the Related Technology

Neural network computations may be performed in data processing systems including microprocessors such as neural processing units (NPUs), central processing units (CPUs), and graphics processing units (GPUs). It is desirable to improve the security of neural network computations.

SUMMARY

According to a first aspect of the present disclosure, there is provided a data processing system comprising: storage; and at least one processor to: generate output data using at least a portion of a first neural network layer; generate a key associated with at least the portion of the first neural network layer; obtain the key from the storage; obtain a version of the output data for input into a second neural network layer; and, using the key, determine whether the version of the output data differs from the output data.

According to a second aspect of the present disclosure, there is provided a method comprising: generating output data using at least a portion of a first neural network layer; generating a key associated with at least the portion of the first neural network layer; storing the key in storage; obtaining the key from the storage; obtaining a version of the output data for input into a second neural network layer; and, using the key, determining whether the version of the output data differs from the output data.

BRIEF DESCRIPTION OF THE DRAWINGS

Further features will become apparent from the following description, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

In examples herein, output data is generated using at least a portion of a first neural network layer. A key associated with at least the portion of the first neural network layer is also generated, and stored in storage. The key is obtained from the storage and a version of the output data for input into a second neural network layer is obtained. Using the key, it can then be determined whether the version of the output data differs from the output data generated using the first neural network layer. This approach for example allows detection of whether the output data has been tampered with, e.g. by a malicious party seeking to expose information useable in the neural network, such as confidential or otherwise sensitive information. In this way, the security of a neural network comprising the first neural network layer can be improved. This approach may also for example allow detection of whether the output data has been corrupted, e.g. due to a soft error, which is for example an error (such as a broken component) that causes stored data (such as the output data) to be altered in an unintended manner, e.g. due to memory corruption. A soft error may for example occur in the storage or may occur in a logic circuit of a processor configured to perform methods according to examples described herein. A soft error may for example be caused by cosmic rays colliding with said processor.

Figure 1:
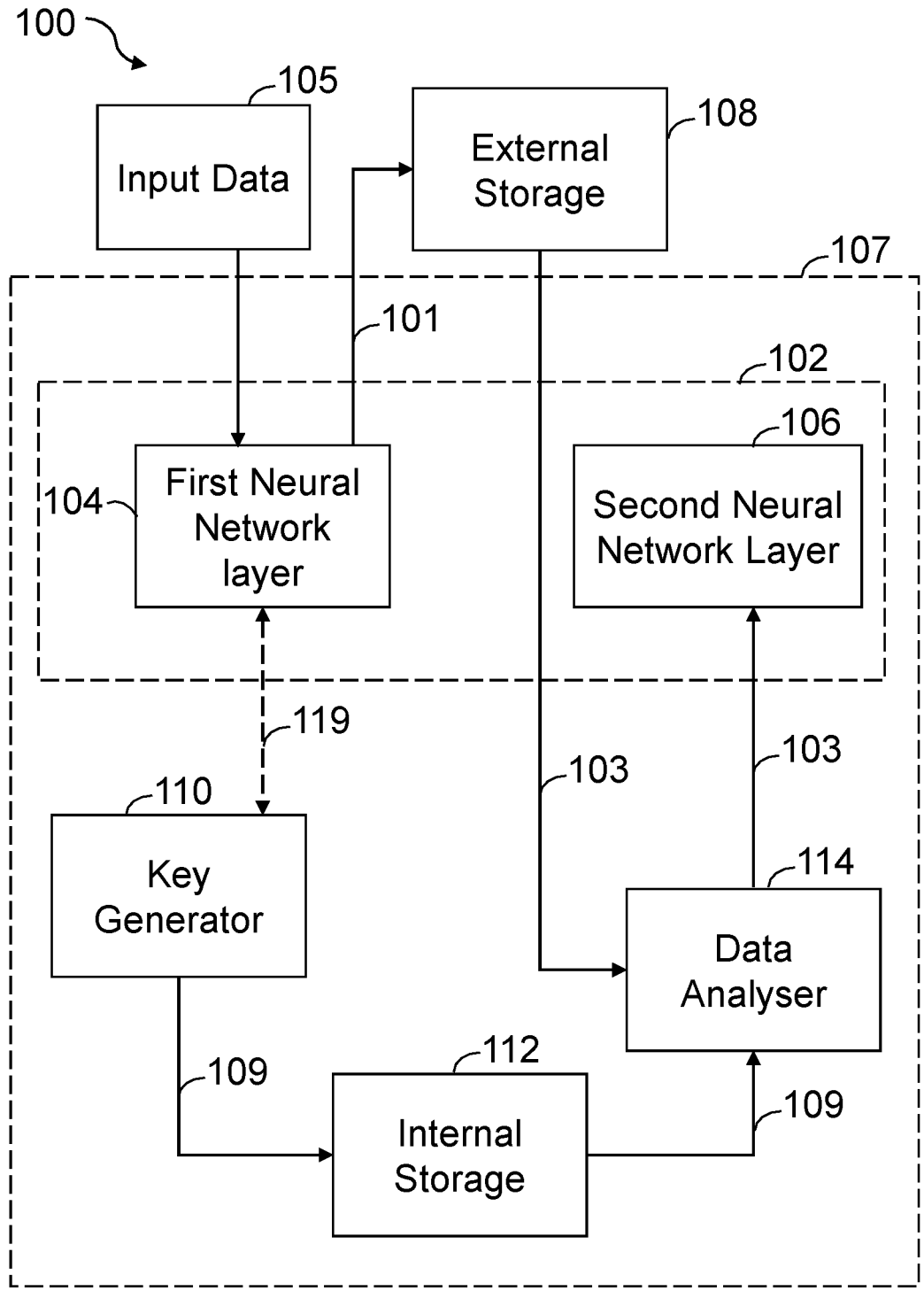
FIG. 1 is a schematic diagram showing a method of determining whether output data generated by a first neural network layer differs from a version of the output data for input into a second neural network layer according to examples.

FIG. 1 is a schematic diagram showing a method 100 of determining whether output data 101 generated by a first neural network layer 104 of a neural network 102 differs from a version of the output data 103 for input into a second neural network layer 106 of the neural network 102. The method 100 may be performed using at least one processor such as a processor of a neural processing unit (NPU), as described in more detail with reference to FIG. 4.

Neural networks for use with the methods herein, such as the neural network 102 of FIG. 1 may be of various types, such as convolutional neural networks (CNNs), recurrent neural networks (RNNs) and similar. In general, a neural network typically includes several interconnected neurons forming a directed, weighted graph in which vertices (corresponding to neurons) or edges (corresponding to connections) are associated with weights and/or biases, respectively. The weights and/or biases may be adjusted throughout training of the neural network for a particular purpose, altering the output of individual neurons and hence the neural network as a whole. The neurons may be arranged in layers, such that information may flow from a given neuron in one layer to one or more neurons in another layer of the neural network. In this way, the output of a given layer may act as an input to a next layer and this may continue for subsequent layers in a neural network. Neural networks such as CNNs may comprise various layer types such as: convolution layer(s), pooling layer(s), activation layer(s) and fully connected layer(s). Layers may be fused (combined) and treated as a fused layer. Other layer types are also well known, and various subcategories exist. In general terms, a specific neural network is defined by its particular arrangement and combination of layer types.

In the method 100, output data 101 is generated using the first neural network layer 104. For example, the output data 101 may be generated by applying an operation on input data 105 that is input to the first neural network layer 104 using weights associated with the first neural network layer 104. The input data 105 is data to be processed by the neural network 102, such as image data, sound data or text data. The operation applied by the first neural network layer 104 may for example be a convolution of the input data 105 and the weights and, in some cases, addition of a bias. In some examples, the data resulting from such an operation may be further processed, for example by applying an activation function and/or pooling the output of the operation. In this way, the first neural network layer 104 may be a fusion of various types of layers such as convolutional layer(s), pooling layer(s), activation layer(s) and/or fully connected layer(s). In some examples, the input data 105 may be divided into portions such that the input data 105 is processed using the first neural network layer 104 on a portion-by-portion basis, e.g. on a tile-by-tile basis. The same principles may also apply to the second neural network layer 106.

Internal storage 112 of a data processing system 107 configured to implement the neural network 102 may not have sufficient storage capacity to store all the data associated with use of the neural network 102, such as the input data 105, the output data 101 and weight data representative of weights associated with a respective layer of the neural network 102. Hence, in the method 100 of FIG. 1, the output data 101 generated using the first neural network layer 104 is stored in external storage 108, which in this example is external to the data processing system 107. An example of a data processing system useable as the data processing system 107 of FIG. 1 is described in more detail with reference to FIG. 4. In an example, the output data 101 generated using the first neural network layer 104 may be compressed. This may reduce a data size of the output data 101 allowing for more efficient use of storage capacity. For example, the output data 101 may be compressed prior to storage in the external storage 108. This may mean that a lower capacity of the external storage 108 may be used to store the output data 101. The output data 101 may be compressed using lossy or lossless compression. Any suitable lossy or lossless compression algorithm may be used to compress the output data 101. However, in other examples, the output data 101 need not be sent to the external storage 108. Instead, the output data 101 may be stored in the internal storage 112 of a data processing system such as the data processing system 107 of FIG. 1 (e.g. if the internal storage 112 has sufficient storage capacity).

In the method 100 of FIG. 1, a key generator 110 generates a key 109 associated with the first neural network layer 104. The association between the key 109 and the first neural network layer 104 is shown by the double-head arrow 119 in FIG. 1. In some cases, information may be sent from the first neural network layer 104 to the key generator 110. For example, an instruction may be sent from the first neural network layer 104 instructing the key generator 110 to generate the key 109 and/or the output data 101 may be sent to the key generator 110 for use in generating the key 109. In other examples, the data processing system 107 may be configured in a different way to nevertheless cause the key generator 110 to generate the key 109 in response to, e.g. after, processing of the input data 105 using the first neural network layer 104. In examples described herein, a key is for example a cryptographic key, which may be in the form of a random sequence of characters generated by a random number generator or a pseudorandom number generator. In other examples, the key may be derived deterministically using a key derivation function that may use a password or passphrase to derive the key. A key may be generated on a per layer basis. In this way, the key 109 associated with the first neural network layer 104 will be different to a key associated with the second neural network layer 106. In some examples, the key 109 is unique to the first neural network layer 104. This reduces the predictability of the key 109 to malicious parties. A new key may be generated for each run of the first neural network layer 104. For example, each time output data 101 is generated using the first neural network layer 104, the key generator 110 may generate a new key 109 associated with the first neural network layer 104. In this way, multiple runs of the first neural network layer 104 at different times will result in different keys being generated at each run. Introducing variability in the key generated on a per layer and per run basis reduces the risk of the key being determined and also limits the amount of information that is leaked. In an example where lossless compression is applied to the output data 101, the key generator 110 may generate the key 109 either before or after the compression. However, in an example where a lossy compression is applied to the output data 101, the key generator 110 may generate the key 109 after the lossy compression. In the method 100 of FIG. 1, the key 109 generated by the key generator 110 is stored in the internal storage 112 of the data processing system 107. In other examples, the key generator 110 may generate multiple keys per layer. This may further improve the security of the data processing system 107, by making it more difficult for a malicious party to determine the key associated with a given portion of data. For example, the output data 101 may be divided into portions such that for each portion of the output data 101 generated using the first neural network layer 104, the key generator 110 generates a key.

In the method 100 of FIG. 1, a data analyser 114 obtains the key 109 from the internal storage 112. In this example, the data analyser 114 also obtains a version of the output data 103 from the external storage 108 for input into the second neural network layer 106.

In the example of FIG. 1, the neurons of the neural network 102 are arranged in layers such that the output of a given layer may act as an input to a next layer. For example, where the method 100 is used to process data representative of an image, the first neural network layer 104 and the second neural network layer 106 may be respective layers of a convolutional neural network. In this example, the output data 101 may be an output feature map, which is useable as an input feature map for input to the second neural network layer 106. In such cases, the method 100 of FIG. 1 may be performed by a processor in an image processing system.

The version of the output data 103 for input into the second neural network layer 106 should be the same as the output data 101 generated using the first neural network layer 104 provided the version of the output data 102 has not been altered. However, the version of the output data 103 for input into the second neural network layer 106 may differ from the output data 101 generated using the first neural network layer 104, e.g. if a malicious party has modified the version of the output data 103. For example, prior to processing the version of the output data 103 using the second neural network layer 106, the version of the output data 103 and, in some cases, weights associated with the second neural network layer 106 may be obtained from the external storage 108. In examples where the output data 101 is compressed, the version of the output data 103 may be decompressed before further processing of the version of the output data 103 (e.g. using the second neural network layer 106). A malicious party may gain unauthorized access to the external storage 108 and may alter the output data 101 generated by the first neural network layer 104, and stored in the external storage 108, to generate a version of the output data 103 for input into the second neural network layer 106 that differs from the output data 101 originally stored in the external storage 108. The malicious party may alter the output data 101 in order to extract information characterizing the second neural network layer 106. For example, the output data 101 may be replaced or modified to provide directed data, for example an impulse response function, for input to the second neural network layer 106 as the version of the output data 103. This may be such that processing the directed data using the second neural network layer 106 (for example by convolving weights associated with the second neural network layer 106 with the directed data in the case of a convolutional layer) outputs the weights of the second neural network layer 106 themselves. This allows a malicious party to determine the weights of second neural network layer 106, leaving the weights exposed to manipulation or unauthorized use. By determining whether the output data 101 generated using the first neural network layer 104 has been tampered with or corrupted before the version of the output data 103 is input to the second neural network layer 106 the security of the neural network 102 is improved.

Many applications of neural networks such as facial recognition for example, require that weights associated with the neural network are secure and not exposed to any other application. In an example of using facial recognition to unlock a smartphone belonging to a specific user, the exposure of weights may allow a third party, knowing these weights, to input specific predetermined data that when operated on by the weights, falsely detects the specific user and unlocks the smartphone. Using the methods herein allows unauthorized modification of the output data 101 to be identified. Appropriate mitigating action can hence be taken, to reduce the risk of sensitive data, such as neural network weights, being exposed.

Using the key 109, the data analyser 114 determines whether the version of the output data 103 differs from the output data 101 generated using the first neural network layer 104. In this way, the data analyser 114 can determine whether the output data 101 has been modified or replaced by different data since being generated and before being input into a second neural network layer 106. In an example where the key generator 110 generates multiple keys per layer, the version of the output data 103 for which this determination is performed may represent a smaller portion of data because, in this case, the output data 101 generated using the first neural network layer 104 may be divided into portions such that the key generator 110 generates a key for each portion of the output data 101. This may reduce the processing power required to perform this determination.

The data analyser 114 may respond in a certain manner in response to the determination of whether the version of the output data 103 for input to the second neural network layer 106 differs from the output data 101 generated using the first neural network layer 104. For example, the data analyser 114 may determine that the version of the output data 103 is the same as the output data 101, and hence that the output data 101 has not been modified or replaced since it was first generated using the first neural network layer 104. The version of the output data 103 may then be processed by the second neural network layer 106 without the risk of the weights and biases of the second neural network layer 106 being exposed. The data analyser 114 in the example of FIG. 1 therefore sends the version of the output data 103 to the second neural network layer 106 for processing in response to such a determination.

In this example, in response to determining that the version of the output data 103 differs from the output data 101, the data analyser 114 generates data indicating that the version of the output data 103 differs from the output data 101. The data generated by the data analyser 114 for example indicates that the output data 101 has been modified or replaced since it was first generated using the first neural network layer 104. This indicates for example that a malicious party may be attempting to input malicious data such as directed data into the second neural network layer 106. In this example, the data indicating that the version of the output data 103 differs from the output data 101 may be used to prevent the processing of the version of the output data 103 using the second neural network layer 106, reducing the risk of the weights associated with the second neural network layer 106 being exposed. The data indicating that the version of the output data 103 differs from the output data 101 may for example represent an indication of such a difference, which may be in any suitable format, e.g. a binary flag indicating whether the output data 103 differs or not. Such an indication may be processed by the second neural network layer 106 to determine whether to proceed with processing the version of the output data 103. In other cases, though, the data analyser 114 may instead or in addition generate appropriate control instructions for sending to the second neural network layer 106 to instruct the second neural network layer 106 not to process the version of the output data 103. In this way, the risk of a malicious party successfully extracting the weights associated with the second neural network layer 106 by tampering with the output data 101 is reduced. It is to be appreciated that the method 100 of FIG. 1 may be repeated for subsequent neural network layers reducing the risk of the weights associated with subsequent neural network layers being exposed.

After determining that the version of the output data 103 differs from the output data 101, various actions may be taken. For example, the second neural network layer 106 may be controlled, e.g. using the data indicating that the version of the output data 103 differs from the output data 101, to omit processing of the version of the output data 103 and/or to further stop the processing performed by the remaining layers of the neural network 102. In another example, e.g. where the at least one processor of the data processing system 107 is controlled and configured by a central processing unit (CPU), an interrupt command may be sent to the CPU in response to determining that the version of the output data 103 differs from the output data 101. In a further example, the at least one processor of the data processing system 107 (which may e.g. be an NPU) may cease processing data, to reduce the risk of processing malicious data. In some examples, the at least one processor (e.g. the NPU) may be reset.

Figure 2:
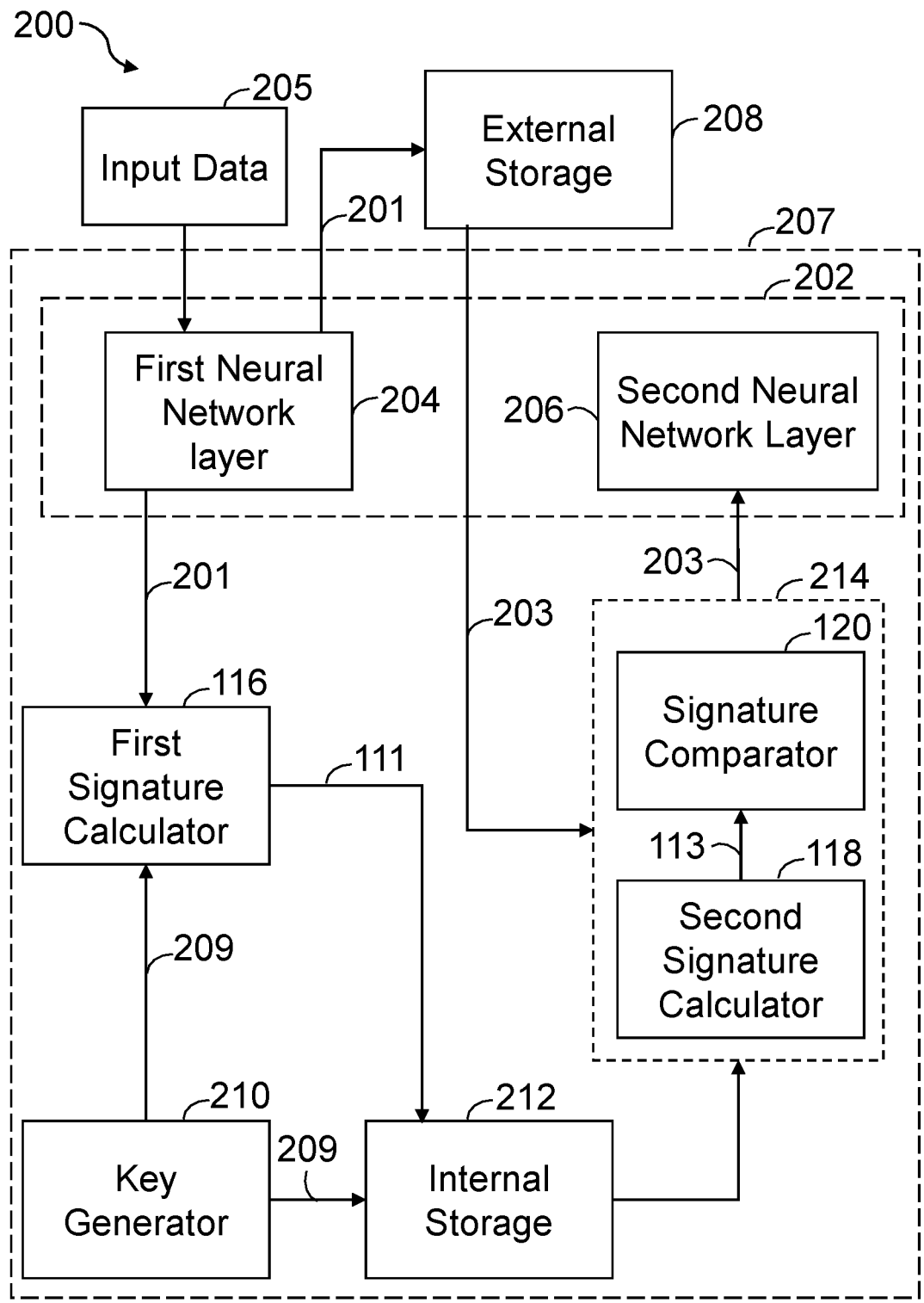
FIG. 2 is a schematic diagram showing a method of determining whether output data generated by a first neural network layer differs from a version of the output data for input into a second neural network layer according to further examples.

The determination of whether the version of the output data differs from the output data can be performed in various ways. FIG. 2 is a schematic diagram showing a method 200 of how this determination is performed. Features of FIG. 2 similar to corresponding features of FIG. 1 are labelled with the same reference numeral but incremented by 100; corresponding descriptions are to be taken to apply.

In the method 200 of FIG. 2, a first signature calculator 116 calculates a first signature 111 based on a key 209 generated by a key generator 210 and output data 201 generated by processing input data 205 using a first neural network layer 204 of a neural network 202.

In examples described herein, a signature may be a value calculated from data and a key that may be used to verify that the data has not been modified or replaced since being generated. In one example, the signature may be a cyclic redundancy check (CRC) based on a remainder of a polynomial division of the data by a value determined by the key. In the case that the first signature 111 is a CRC, this may be calculated based on the remainder of a polynomial division of the output data 201 generated by the first neural network layer 204 by the key 209 associated with the first neural network layer 204. Although the CRC is given here as an example, it should be understood that any type of signature (e.g. hash-based signatures) may be used to verify that the data has not been modified or replaced since being generated. Since the key can be generated on a per layer and/or per run basis as described above, it is to be understood that the signature may differ for outputs of different neural network layers and/or for outputs of the same neural network layer at different times. The variability in the signature calculated on a per layer and per run basis reduces the risk of the signature being determined. In the method 200 of FIG. 2, the first signature 111 calculated by the first signature calculator 116 is stored in internal storage 212 of the data processing system 207.

In the example shown in FIG. 2, a data analyser 214 includes a second signature calculator 118 that calculates a second signature 113 based on the key 209 obtained from the internal storage 212 and a version of the output data 203 for input into a second neural network layer 206 of the neural network 204. The version of the output data 203 is obtained from external storage 208 external to the data processing system 207. The second signature 113 may be calculated using the same method used to calculate the first signature 111 but instead based on the key 209 and the version of the output data 203 (rather than the key 209 and the output data 201). For example, in the case that the first signature 111 is a CRC, the second signature 113 may also be a CRC which is instead calculated based on the remainder of a polynomial division of the version of the output data 203 (as opposed to the output data 201 generated by the first neural network layer 204 in the case of the first signature 111) by the key 209 associated with the first neural network layer 204. In this case, to determine whether the version of the output data 203 differs from the output data 201, the data analyser 214 includes a signature comparator 120. The signature comparator 120 determines whether the second signature 113 is equal to the first signature 111 obtained from the internal storage 212. In this way, determining that the second signature 113 is not equal to the first signature 111 may indicate that the output data 201 generated using the first neural network layer 204 has been modified or replaced by potentially malicious data. Therefore, a check can be made before the version of the output data 203 is processed using the second neural network layer 206, e.g. to check whether the weights associated with the second neural network layer 206 are at risk of exposure. In an example, the version of the output data 203 may only be processed using the second neural network layer 206 in response to the signature comparator 120 determining that the second signature 113 is equal to the first signature 111. The second signature 113 being equal to first signature 111 may indicate that the output data 201 generated using the first neural network layer 204 has not been modified or replaced by malicious data such as directed data. In this way, the risk of the weights associated with the second neural network layer 206 being exposed is reduced.

Figure 3:
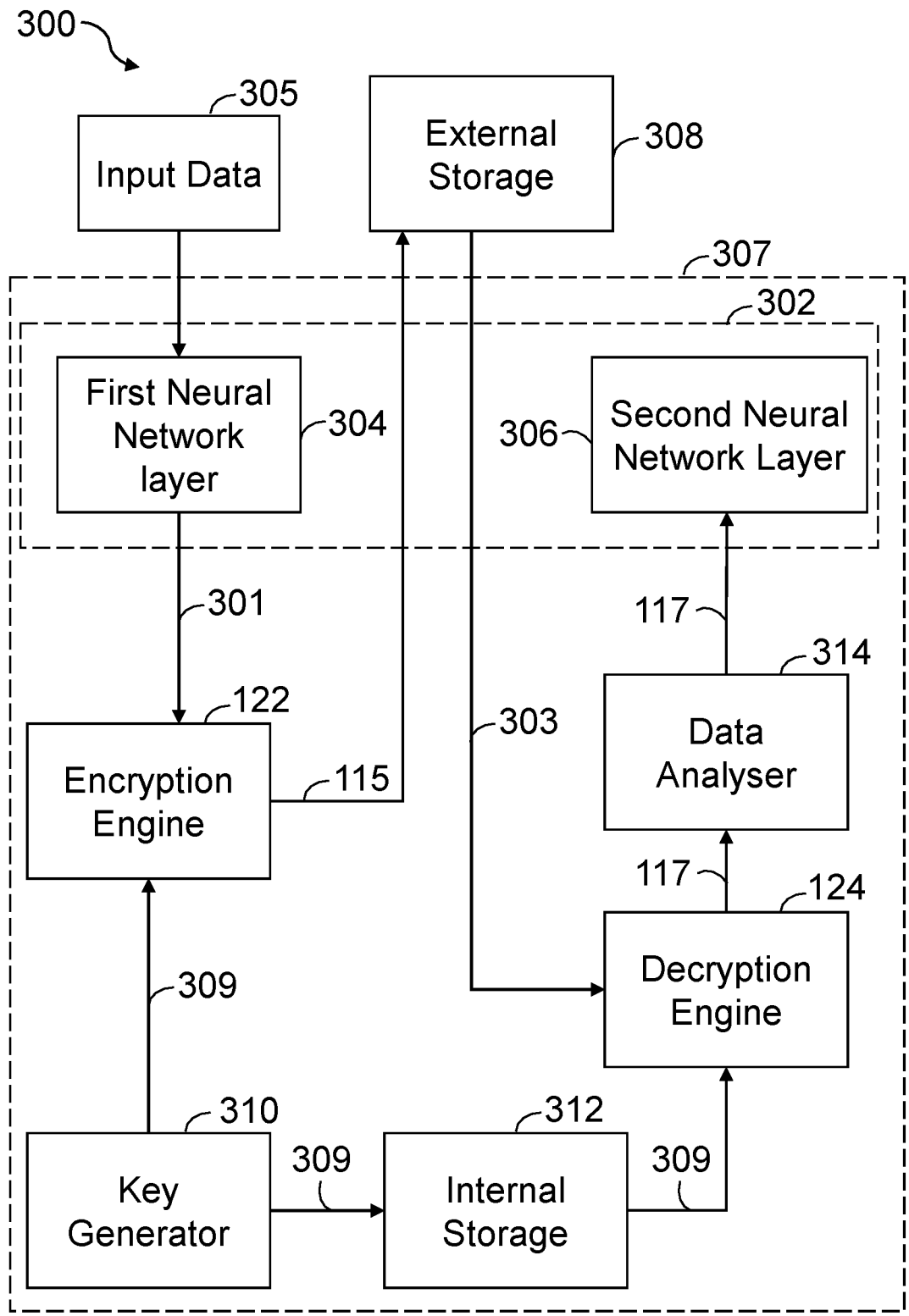
FIG. 3 is a schematic diagram showing a method of determining whether output data generated by a first neural network layer differs from a version of the output data for input into a second neural network layer according to further examples.

FIG. 3 is a schematic diagram showing a method 300 of determining whether a version of the output data 303 differs from the output data 301 according to further examples. Features of FIG. 3 similar to corresponding features of FIG. 1 are labelled with the same reference numeral but incremented by 200; corresponding descriptions are to be taken to apply. It is to be understood that the method 300 of FIG. 3 can be applied on its own or in combination with the method 200 of FIG. 2 to determine whether output data 301 generated using a first neural network layer 304 of a neural network 302 differs from a version of the output data 303, which in this case is obtained from external storage 308 external to a data processing system 307 for implementing the neural network 302.

In the method 300 of FIG. 3, an encryption engine 122 encrypts the output data 301 generated by processing input data 305 using the first neural network layer 304. The encryption engine 122 encrypts the output data 301 using a key 309 generated by the key generator 310. An encryption engine for example includes or uses at least one processor that is configured to implement an encryption scheme to encrypt data. This at least one processor may be a processor of an NPU as described in more detail with reference to FIG. 4. For example, the encryption engine 122 may implement an encryption scheme such that the output data 301 is encrypted to generate encrypted output data 115 which is stored in the external storage 308. The encryption engine may be configured to encrypt the output data 301 using a particular encryption algorithm. The encryption algorithm implemented by the encryption engine may differ for outputs of different neural network layers. In other words, the encryption engine 122 may encrypt data received from different respective neural network layers using different respective encryption algorithms. Moreover, as explained above, the key 309 can be generated on a per layer and/or per run basis. Such variability in the key 309 and/or the encryption algorithm reduces the risk of a malicious party being able to successfully decrypt the encrypted output data 115. The key 309 is stored in the internal storage 312 in this example, which is typically more secure than the external storage 308.

Storing the encrypted output data 115 in the external storage 308 (which is typically more susceptible to unauthorized access than the internal storage 312) instead of the output data 301, reduces the risk of a malicious party obtaining a useable version of the output data 301. For example, even if the malicious party obtains the encrypted output data 115 from the external storage 308, they must still decrypt the encrypted output data 115 before use, which is generally difficult, if not impossible, without the key 309. This can be beneficial in certain use cases, which involve the processing of sensitive input data 305, such as super resolution neural networks. Super resolution neural networks can be used to generate a high resolution image from its lower resolution counterpart, and may require that inputs and outputs associated with the neural network 302 (such as the inputs and outputs associated with a given neural network layer) are secure and not exposed to any other applications. In an example of using a super resolution network to upscale video content hidden behind a subscriber paywall, the exposure of inputs (for example the low resolution image) or outputs (for example the high resolution image) may allow a third party to access the video content without paying the required subscription fee. However, the methods herein may be used to reduce the risk of exposure of private content to unauthorized parties. In some examples, the malicious party may replace or modify the input data 305 to provide directed data, for example an impulse response function, for input into the first neural network layer 304. This may be such that processing the input data 305 using the first neural network layer 304 outputs the weights and/or biases of the first neural network layer 304. However, if the output data 301 is encrypted, the malicious party will be unable to decrypt the encrypted output data 115 (and hence access the weights and/or biases) unless they gain access to the key 309, which is stored securely in the internal storage 312. This reduces the risk of exposure of weights and/or biases of the first neural network layer 304.

In the method 300 of FIG. 3, a decryption engine 124 decrypts a version of the output data 303 obtained from the external storage 308 using the key 309 obtained from the internal storage 312. In this way, the decryption engine 124 generates a decrypted version of the output data 117. The decryption engine 124 for example includes or uses at least one processor that is configured to implement a decryption scheme in order to decrypt data. This at least one processor may be a processor of an NPU as described in more detail with reference to FIG. 4. The decryption engine 214 is configured to implement an appropriate decryption algorithm to decrypt the version of the output data 303, which was previously encrypted by the encryption engine 212. In the example of FIG. 3, a symmetric key encryption algorithm is used, in which the same key 309 is used to encrypt the output data 301 and to decrypt the version of the output data 303. However, this is merely an example, and in other cases an asymmetric key encryption algorithm may instead be used. The version of the output data 303 is decrypted by the decryption engine 214 before being input into the second neural network layer 306.

In this example, the data analyser 314 determines whether the version of the output data 303 differs from the output data 301 based on the decrypted version of the output data 117. For example, if the version of the output data 303 has been modified, e.g. by a malicious party, decrypting the version of the output data 303 will typically lead to a decrypted version of the output data 117 that is unusable as an input to the second neural network layer 306. Furthermore, if a malicious party has replaced the encrypted output data 115 stored in the external storage 308, e.g. with directed data for use as the version of the output data 303, the decrypted directed data will differ from the directed data that the malicious party intended for processing using the second neural network layer 306 with the aim of exposing the weights of the second neural network layer 306 as described above. Hence, processing the decrypted directed data using the second neural network layer 306 will not output the weights associated with the second neural network layer 306 in the way that processing the originally input directed data would. In other examples, the data analyser 314 may evaluate features of the decrypted version of the output data 117 (which may be referred to as statistics) in order to determine whether the version of the output data 303 differs from the output data 301. For example, the data analyser 314 may evaluate the mean or variance of the decrypted version of the output data 117 or a portion of the output data 117. If the version of the output data 303 has been modified, e.g. by a malicious party, the features of the decrypted version of the output data 117 may significantly differ from expected features, e.g. based on the of the output data 301. In response to the data analyser 314 determining that the features of the decrypted version of the output data 117 differs from the expected features, the data analyser 314 may generate data indicating that the version of the output data 303 differs from the output data 301 as described above with reference to the data analyser 114 of FIG. 1. This may allow the data analyser 314 to prevent further processing of the decrypted version of the output data 303, e.g. reducing the risk of the weights associated with the second neural network layer 306 being exposed. For example, the data analyser 314 may determine whether the mean and/or variance of the decrypted version of the output data 117 are outside a predetermined range and generate the data indicating that the version of the output data 303 differs from the output data in response to the mean and/or variance being outside the predetermined range.

Figure 4:
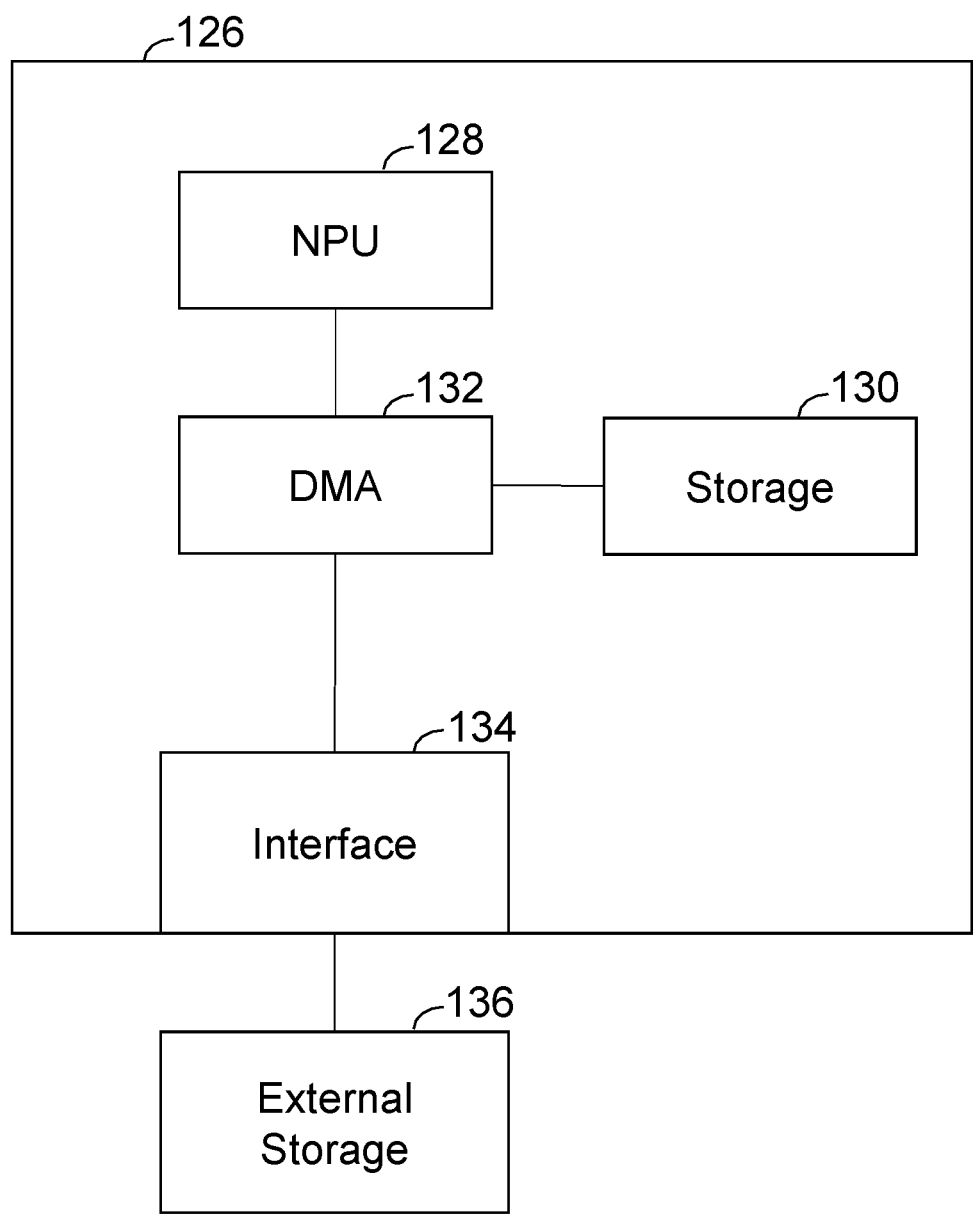
FIG. 4 is a schematic diagram of an image processing system according to examples.

FIG. 4 is a schematic diagram of a data processing system according to examples. In this example, the data processing system is an image processing system 126 arranged to receive an image as an input, and to process the image. However, this is merely an example. It should be appreciated that a data processing system that includes similar components or the same components as the image processing system 126 of FIG. 4 may be used to implement any of the methods herein, e.g. to process other types of data such as text data or sound data for example. The image processing system 126 may for example be implemented in hardware (e.g. in the form of a system-on-a-chip (SoC), which may be or include suitable programmed circuitry), or software, or a combination of hardware and software.

The image processing system 126 includes a neural processing unit (NPU) 128. The NPU 128 is operable or otherwise configured to perform any of the methods described herein, such as the methods 100, 200 and/or 300 of FIG. 1, FIG. 2 and/or FIG. 3. In other examples, the image processing system 126 may instead include any processor or group of processors that can be configured to implement a neural network and therefore perform any of the aforementioned methods. For example, neural networks such those of examples herein can be implemented using at least one of a neural processing unit (NPU), a central processing unit (CPU), a graphics processing unit (GPU), a digital signal processor (DSP), and/or a coprocessor. An example of this is a CPU which includes a driver to provide an interface between software configured to control or configure the neural network and the NPU 128.

The image processing system 126 also includes storage 130 for storing the key and in some examples, the first signature as described in examples above. The storage 130 may be static random access memory (SRAM). Alternatively, the storage 130 may be or include a plurality of single-bit storage devices. Typically, a single-bit storage device is an electronic component with two stable states, one of which represents a value of zero, and the other of which represents a value of one, for example. A flip-flop and a latch are each examples of single-bit storage devices. The plurality of single-bit storage devices may be used to store the key in cases where the data size of the key is relatively small. The storage 130 may be on-chip or local storage of the image processing system 126. In this case, the storage 130 may correspond to the internal storage 112, 212, 312 shown in FIGS. 1 to 3. Storing the key in local storage allows for quicker access to the key and more secure storage of the key. In some cases, the storage 130 may include a plurality of separate storage areas.

The image processing system 126 includes a direct memory access (DMA) engine 132 to control data flow in the image processing system 126. In this example, the DMA engine 132 is configured to allow the NPU 128 to access the storage 130 directly, e.g. independently of other components both internal and external to the image processing system 126. The DMA engine 132 may be configured to transfer the key solely between the NPU 128 and the storage 130 of the image processing system 126, without transferring the key to other components, e.g. any other internal components of the image processing system 126 and/or any components external to the image processing system 126. For example, the key stored in the storage 130 may be solely accessible to the unit in the image processing system 126 responsible for controlling data flow, namely the DMA engine 132, which can in turn control which other components the key is provided to. For example, the DMA engine 132 may be configured to send the key to the NPU 128 but not to other components of the image processing system 126. This reduces the opportunity for the key to be obtained by a malicious party since a limited number of components in the image processing system 126 have access to the key. In the example where the storage 130 includes a plurality of single-bit storage devices such as a plurality of flip-flops, the DMA engine 132 may not be required for the NPU 128 to access the storage 130. In general, it is to be appreciated that, in some examples, the image processing system 126 is configured such that the storage 130 is solely accessible by the NPU 128 of the image processing system 126.

Where the image processing system 126 is configured to implement the method 200 of FIG. 2, the storage 130 may also store the first signature calculated by a first signature calculator, such as first signature calculator 116 of FIG. 2. In the same way as described above for the key, the first signature stored in the storage 130 may also be solely accessible by the unit in the image processing system 126 responsible for controlling data flow, namely the DMA engine 132, which can in turn control which other components the first signature is provided. For example, the DMA 132 may be configured to send the first signature to the NPU 128 but not to other components internal to the image processing system 126 and/or externally. Therefore, the first signature may have similar access restrictions as the key. This similarly reduces the opportunity for the first signature to be obtained by a malicious party.

The image processing system 126 includes an interface 134, via which the NPU 128 communicates with external storage 136 in a manner controlled by the DMA engine 132. The external storage 136 is external to the image processing system 126 and may be a random access memory (RAM) such as DDR-SDRAM (double data rate synchronous dynamic random access memory). In other examples, the external storage 136 may be or include a non-volatile memory such as Read Only Memory (ROM) or solid state drive (SSD) such as Flash memory. The external storage 136 in examples may include further storage devices, for example magnetic, optical or tape media, compact disc (CD), digital versatile disc (DVD) or other data storage media. For example, the external storage 136 may be or include storage (such as a main memory or system memory) of a computing system or device arranged to use the image processing system 126 to process input image data. Such a computing device may be a personal computer, a smartphone, a tablet, an image capture device (such as camera or video camera) or an on-board computer device which may be coupled to or mounted within a vehicle such as a car, although this is not intended to be limiting.

As explained above, when implementing neural networks, it may not be possible for all of the data including, for example, the input data, the output data, and data corresponding to the operations involved in the neural network such as weights and/or biases, to be stored in the storage 130 internal to the image processing system 126. At least some of the data may be stored in the external storage 136, which may include volatile and/or non-volatile storage. The NPU 128 may access the external storage 136 when executing the neural network via the interface 134. In this example, the NPU 128 is configured to send the output data to the external storage 136, external to the image processing system 126. In this case, the NPU 128 is also configured to obtain the version of the output data from the external storage 136, the version of the output data being for input into the second neural network layer as described in examples above. Using the external storage 136 alongside the storage 130 of the image processing system 126 allows larger amounts of data associated with the neural network processed by the NPU 128 to be stored compared to solely using the storage 130 of the image processing system 128.

Figure 5:
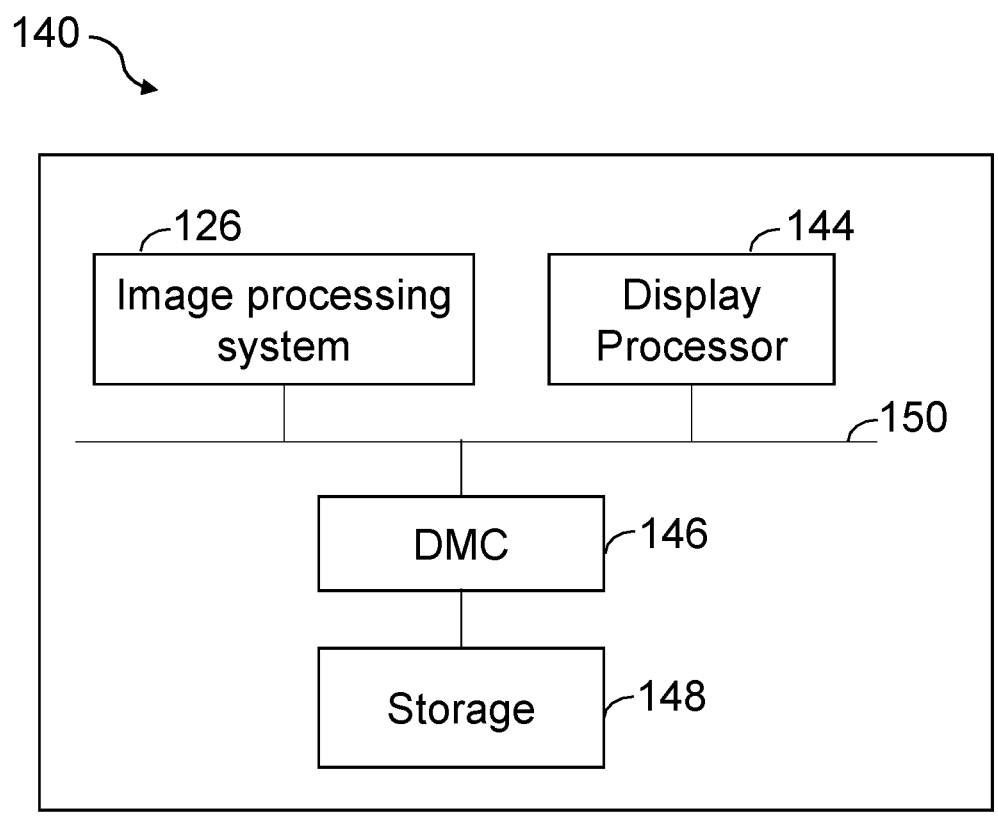
FIG. 5 is a schematic diagram of internal components of an example computing system including the image processing system of FIG. 4.

FIG. 5 is a schematic diagram of internal components of an example computing system 140 including the image processing system 126 of FIG. 4. The computing system 140 includes a display processor 144, which in this example is configured to process image data output by the image processing system 126 to generate an image for display. For example, the image processing system 126 may be configured to implement a super resolution neural network and the display processor 144 may be configured to process the image data output by the image processing system 126 representing the high resolution image to generate the high resolution image for display.

In this example, the image processing system 126 is arranged to perform the methods described with reference to FIG. 1, to determine whether output data generated by a first neural network layer (which may be referred to in this example as first output data) differs from a version of the output data, using a key associated with the first neural network layer (which may be referred to in this example as a first key). A method 152 of sending a key to a data processing system such as the image processing system 126 of FIGS. 4 and 5 is shown in FIG. 6.

Figure 6:
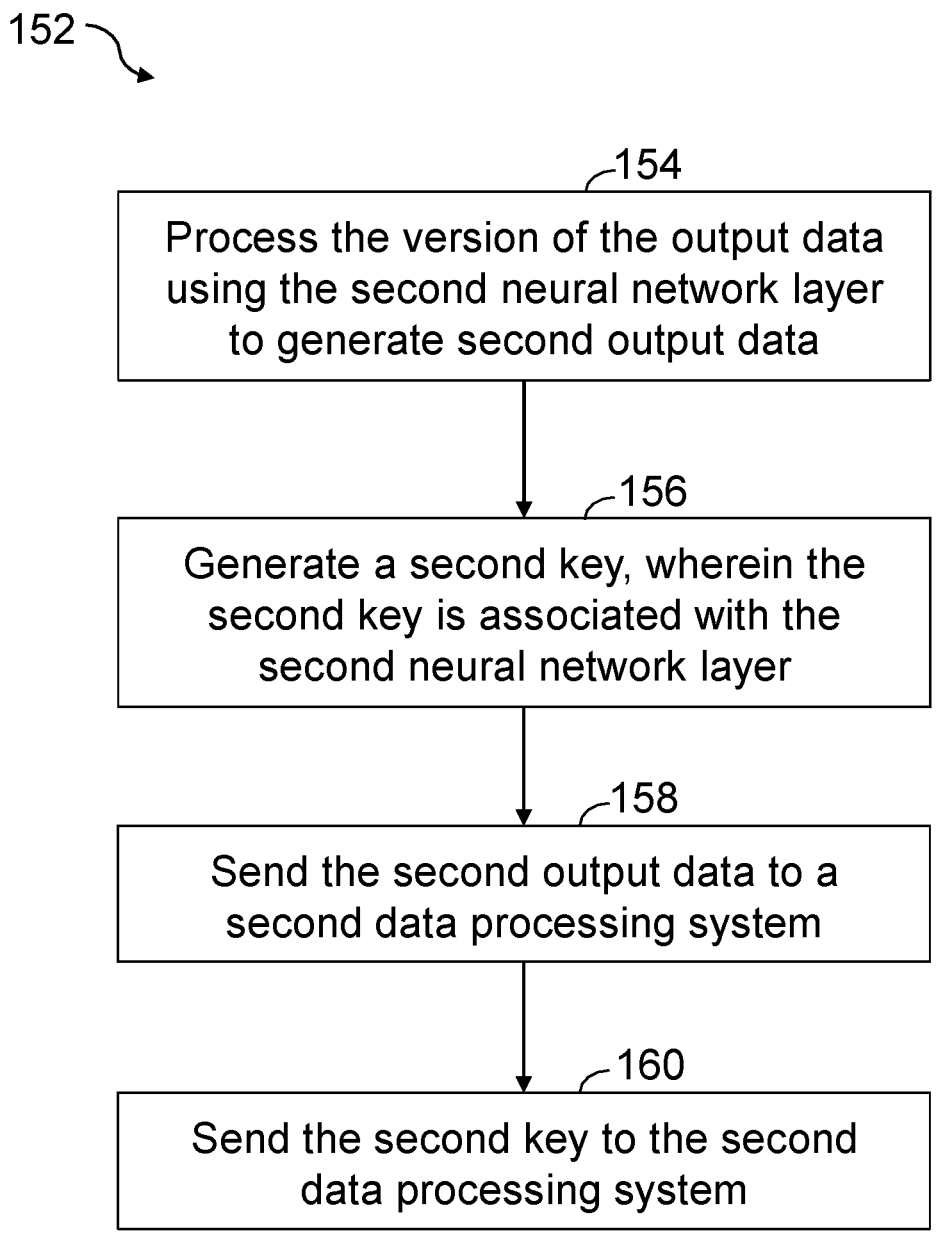
FIG. 6 is a flow diagram showing a method of sending a key to a data processing system according to examples.

In FIG. 6 item 154 of the method 152 includes processing the version of the output data using the second neural network layer to generate second output data. As discussed above with reference to FIG. 1, the version of the first output data may be processed using the second neural network layer in response to the image processing system 126 (e.g. an NPU of image processing system 126) determining that the version of the first output data is the same as the first output data generated using the first neural network layer. In some examples, the second neural network layer in this case may represent the last neural network layer of the neural network such that the second output data represents the output of the neural network. In other examples, the second neural network layer may be another neural network layer of the neural network such that the second output data represents the output of a neural network layer that is not the last neural network layer of the neural network.

Item 156 of the method 152 includes generating a second key. In this case, the second key is associated with the second neural network layer. For example, the second key may be unique to the second neural network layer. Similar to the first key, the second key may also be generated on a per-run basis such that multiple runs of the second neural network layer at different times will result in different keys being generated at each run. In other examples similar to examples described above with reference to the first neural network layer, multiple keys may be generated that are associated with the second neural network layer.

Item 158 of the method 152 includes sending the second output data to a second data processing system. In this example (in which the method 152 is implemented using the computing system 140 of FIG. 5), the image processing system 126 may be considered to be a first data processing system, and the display processor 144 may be considered to be a second data processing system. However, it is to be appreciated that these are merely non-limiting examples of first and second data processing systems, and the method 152 of FIG. 6 may be performed with other data processing system(s) than these.

Item 160 of the method 152 includes sending the second key to the second data processing system, which in this example is the display processor 144. The second output data and the second key may be sent together to the second data processing system, e.g. in the same communication, or may be sent separately, e.g. at different respective times. Referring back to FIG. 5, the computing system 140 of FIG. 5 includes a dynamic memory controller (DMC) 146 which may be used to control access to storage 148 for the image processing system 126 and the display processor 144. In this example, the second key is sent to the display processor 144 using a shared storage 148 accessible to both the image processing system 126 and the display processor 144 via the DMC 146. This may be done to ensure secure transfer of the second key to the display processor 144 such that the risk of a malicious party obtaining the second key is reduced. As shown in FIG. 5, with the second key stored in the shared storage 148, the second key may be solely accessible by the unit of the computing system 140 responsible for controlling data flow, namely the DMC 146 in this example (although this need not be the case in other examples). The storage 148 in which the second key is stored may be the same external storage (external to the image processing system 126) as that in which the first output data and/or the second output data is stored, such as the external storage 136 shown in FIG. 4. In other cases, though, the storage 148 for storing the second key may be different from storage for storing data associated with the neural network, such as the first and/or second output data. For example, the computing system 140 of FIG. 5 may itself be implemented in hardware, e.g. as a SoC. In this example, the storage 148 may be internal storage of the computing system 140, and the storage for storing data associated with the neural network may be external to the computing system 140.

The transfer of the second key to the display processor 144 may be performed securely by assigning trust levels to each component of the computing system 140 in order to determine how much access the component has to certain data or other components such as the storage 148 storing the second key. For example, components within a secure environment ("or secure domain") may be trusted within the computing system 140 and therefore allowed access to security-sensitive data within the computing system 140 for example. Components outside the secure environment (e.g. in a less secure environment or a "non-secure domain"), however, may not be allowed access to such security-sensitive data such as the second key stored in the storage 148. In this way, components in the secure environment may have access to certain storage (e.g. secure or "protected" memory regions) which are not accessible to components and systems outside the secure environment. In this example, the image processing system 126 and the display processor 144 may both be assigned trust levels indicating that the image processing system 126 and the display processor 144 are within the secure domain allowing them access to the storage 148. This may therefore allow the second key to be securely sent to the display processor 144 using the shared storage 148 accessible to both the image processing system 126 and display processor 144. In this case, the shared storage 148 may also have been assigned a trust level indicating that the shared storage 148 is within a secure domain allowing the shared storage 148 to store security-sensitive data such as the second key. These access controls may be implemented using an embedded hardware technology such as TrustZone® by Arm®. In this way, the second key may only be shared with components of the computing system 140 meeting certain security requirements, thereby reducing the risk of the second key being obtained by unauthorized parties.

The computing system 140 of FIG. 4 uses a systems bus 150. This allows data to be transferred between the various components such that the shared storage 148 is accessible to both the image processing system 126 and the display processor 144 via the DMC 146. The bus 150 may be or include any suitable interface or bus. For example, an ARM® Advanced Microcontroller Bus Architecture (AMBA®) interface, such as the Advanced eXtensible Interface (AXI), may be used.

The second output data may be encrypted before being sent to the display processor 144 for example using an encryption engine such as the encryption engine 122 described above with reference to FIG. 3. The second output data may be encrypted by applying an encryption algorithm, using the second key, e.g. in a similar manner to encrypting the output data 301 of FIG. 3.

The second key may be used by the display processor 144 to determine whether the version of the second output data obtained by the display processor 144 from the image processing system 126 differs from the second output data generated using the second neural network layer of the image processing system 126. This determination may be performed using similar methods to those described with reference to FIGS. 2 and 3 to determine whether a version of the output data differs from the output data. In an example where a first and second signature are calculated, the first signature will be calculated by the image processing system 126, e.g. by an NPU of the image processing system 126, based on the second key and the second output data. The first signature may then be sent to the display processor 144 similarly to how the second key is sent to the display processor 144 since as discussed above, signatures and keys may have the same accessibility requirements. The display processor 144 may be configured to calculate the second signature based on the obtained version of the second output data and the second key so that it can be determined whether the second signature is equal to the first signature. This allows the display processor 144 to identify whether the second output data has been tampered with or corrupted since being generated using the second neural network layer of the image processing system 126.

The display processor 144 may then determine whether to process the second output data based on determining whether the version of the second output data differs from the second output data. For example, the display processor 144 may only process the version of the second output data in response to determining that the version of the second output data is the same as the second output data. This may reduce the risk of exposing sensitive information to a malicious party.

Figure 9:
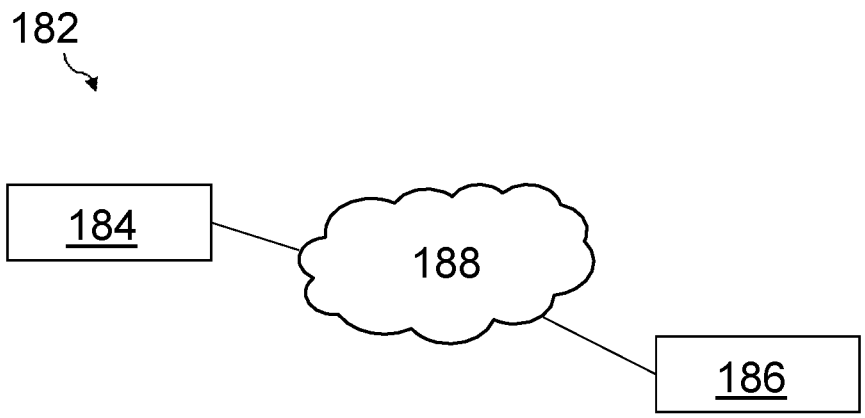
FIG. 9 is a schematic diagram of a system including a network according to examples.

In other examples, e.g. where the image processing system 126 and the display processor 144 are within different computing systems as will be described below with reference to FIG. 9, it may not be possible for the second key to be sent to the display processor 144 using a shared storage accessible to both the image processing system 126 and the display processor 144. In these examples, the second key can be transferred securely to the display processor 144 by sending the second key to the display processor 144 through a first data channel different to a second data channel through which the second output data is sent to the display processor 144. In this example, a data channel describes an information route taken between two components, e.g. the image processing system 126 and the display processor 144. As such, separate data channels may vary in their bandwidth, communication protocols, devices that information is routed through and/or various other factors. For example, the first data channel through which the second key is sent to the display processor 144 may use a cryptographic communication protocol such as the Diffie-Hellman key exchange protocol in order to securely exchange the second key between the NPU and the display processor 144. Sending the second key to the display processor 144 through a separate, secure data channel may reduce the risk of the second key being obtained by a malicious party.

Figure 7:
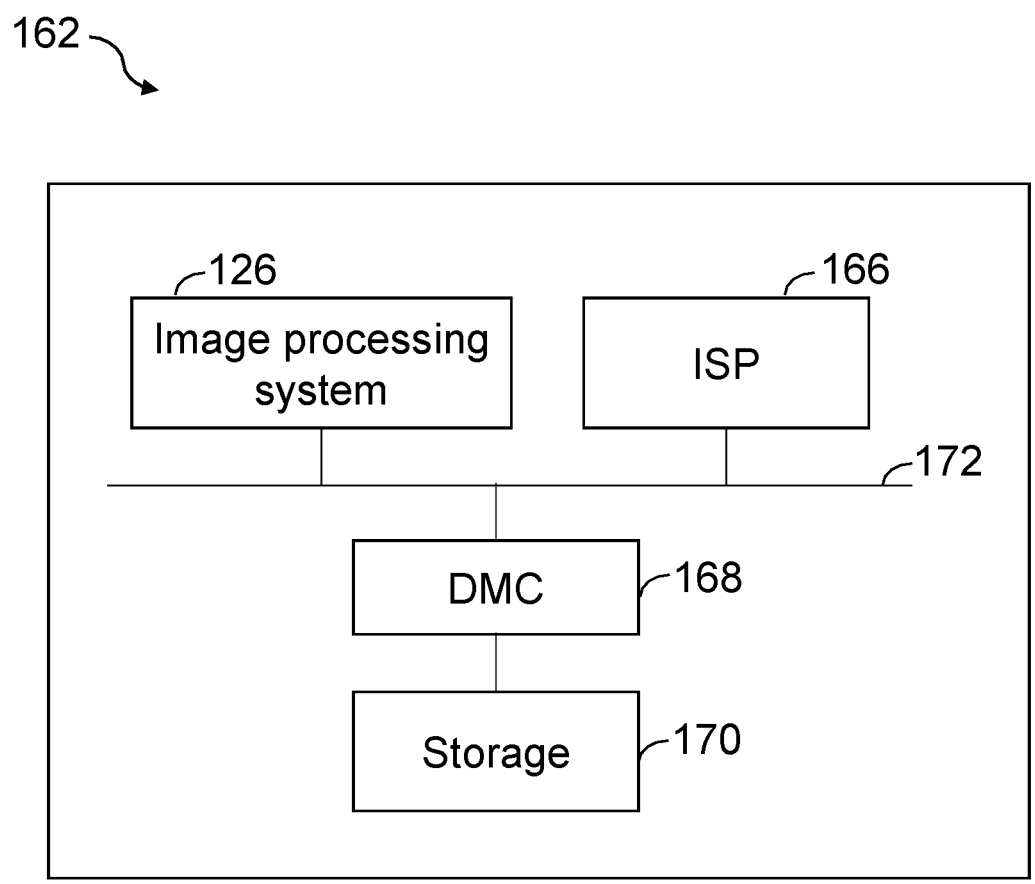
FIG. 7 is a schematic diagram of internal components of a further example computing system including the image processing system of FIG. 4.

FIG. 7 is a schematic diagram of internal components of a computing system 162 including the image processing system 126 of FIG. 4, according to yet further examples. The computing system 162 includes image signal processor (ISP) 166, which may for example be an ISP of a digital camera which processes raw data captured by an image sensor of the digital camera to generate image data that is then sent to the image processing system 126 for further processing. For example, the image data may be input into a first neural network layer implemented by the image processing system 126.

In this example, the image processing system 126 is arranged to perform the methods described with reference to FIG. 1, to determine whether output data generated by a first neural network layer (which may be referred to in this example as first output data) differs from a version of the output data, using a key associated with the first neural network layer (which may be referred to in this example as a first key). A method 174 of determining whether input data for input into a first neural network layer differs from a version of the input data for input into the first neural network layer of a neural network, e.g. as implemented by the image processing system 126, is shown in FIG. 8.

Figure 8:
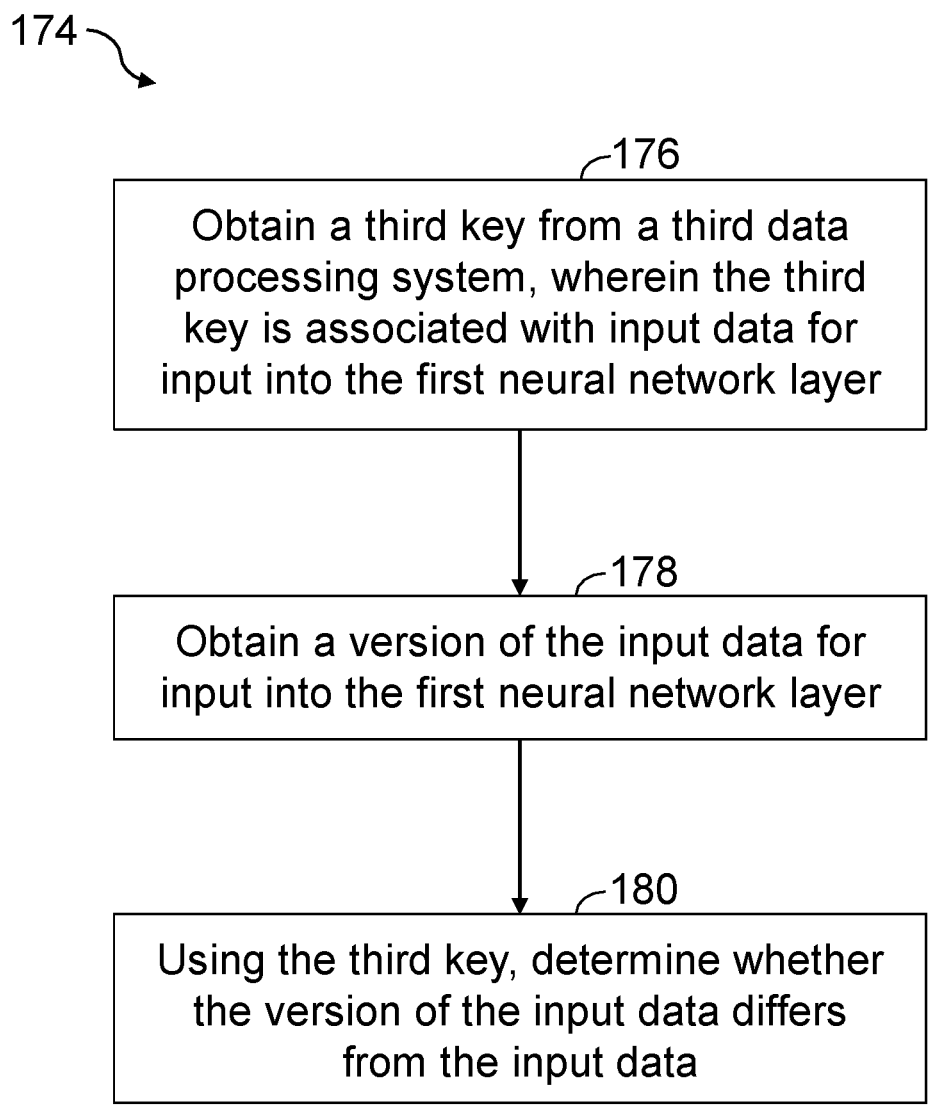
FIG. 8 is a flow diagram showing a method of determining whether input data for input into a first neural network layer differs from a version of the input data for input into the first neural network layer according to examples.

The method 174 of FIG. 8 provides a way of determining whether input data for input to the first neural network layer of the neural network implemented by the image processing system 126, e.g. by an NPU of the image processing system 126, has been tampered with, to improve the security of the neural network. As described above, if data for input into the first neural network layer has been replaced or modified with malicious data, such as directed data, then the operation of the first neural network layer on this malicious data may expose the weights of the first neural network layer.

Item 176 of the method 174 includes obtaining a third key from a third data processing system, which in this example is the ISP 166. The image processing system 126 of FIG. 7 may be considered to correspond to a first data processing system. The method 174 of FIG. 8 may be implemented in a computing system comprising at least one further data processing system, such as a second data processing system, e.g. a display processor, although this need not be the case. It is to be appreciated that these are merely non-limiting examples of first, second and third data processing systems, and the method 174 of FIG. 8 may be performed with other data processing system(s) than these.

The third key obtained at item 176 of the method 174 is associated with input data for input into the first neural network layer to be processed using the image processing system 126 (e.g. by an NPU of the image processing system 126). This input data may be image data generated by the ISP 166 such that the third key is associated with the image data. The third key may be transferred between the ISP 166 and the image processing system 126 using any of the secure mechanisms described above. For example, as shown in FIG. 7, the computing system 162 includes a dynamic memory controller (DMC) 168 which may be used to control access to storage 170 for the image processing system 126 and the ISP 166. In this case, the third key may be sent to the image processing system 126 from the ISP 166 using a shared storage 170 accessible to both the image processing system 126 and the ISP 166 via the DMC 168. This may be in a similar manner to how the second key is transferred to the display processor 144 as described with reference to FIG. 5.

Item 178 of the method 174 includes obtaining a version of the input data for input into the first neural network layer. The version of the input data is for example obtained by the image processing system 126 from the ISP 166. The version of the input data may be received by the image processing system 126 directly from the ISP 166 or may be stored in storage (which may be the same as or different from the storage 170 of the computing system 162) and subsequently obtained by the image processing system 126.

Item 180 of the method 174 includes using the third key to determine whether the version of the input data differs from the input data. As such, it can be determined if there is a risk of the exposure of the weights associated with the first neural network layer should the image processing system 126 process the version of the input data using the first neural network layer. This determination may be performed using similar methods to those described above. In an example where a first and second signature are calculated, the first signature may be calculated by the ISP 166 based on the third key and the input data. The first signature may then be sent to the image processing system 126 in a secure manner, e.g. the same secure manner as that in which the third key is sent to the image processing system 126. The image processing system 126 may then calculate the second signature based on the obtained version of the input data and the third key so that it can be determined whether the second signature is equal to the first signature and therefore whether the input data has been tampered with during transmission between the ISP 166 and the image processing system 126.

The image processing system 126 may process the version of the input data using the first neural network layer in response to determining that the version of the input data is the same as the input data. In response to determining that the version of the input data differs from the input data, the image processing system 126 may be configured to generate data representing an indication that the version of the input data differs from the input data and/or the image processing system 126 may omit processing of the version of the input data using the first neural network layer. This reduces the risk of the first neural network layer being used to process input data containing malicious data, e.g. that could expose the weights associated with the first neural network layer.

In some examples, the input data is encrypted using the third key to generate encrypted input data for transmission to the image processing system 126. In these examples, the image processing system 126 (e.g. an NPU of the image processing system 126) may include a decryption engine configured to decrypt the version of the input data for input into the first neural network using the third key. The decryption engine may for example be the same as or similar to the decryption engine 124 described above with reference to FIG. 3. Encrypting the input data in this manner improves the security of the input data. In this example, the image processing system 126 may determine whether the version of the input data differs from the input data based on the decrypted version of the input data.

Although the computing system of FIG. 7 includes an ISP 166, it is to be understood a computing system otherwise similar to the computing system 162 of FIG. 7 could instead include a different data processing system, such as a data processing system of a different input device than an image sensor, such as an input device including one or more sensors. In such cases, the one or more sensors may be configured to obtain sensor data and send the sensor data to the image processing system 126 for processing. The plurality of neural network layers implemented by the image processing system 126 may be used to perform a task on the input data obtained from an input device such as facial recognition for example in a case where the data for input to the image processing system 126 includes image data. Additionally, or alternatively, the input device may include a decoder configured to output decoded data to the image processing system 126. For example, the decoder may be a video decoder which decodes a video and outputs the decoded video to the image processing system 126 to be processed by the neural network. It is to be appreciated that data sent from the input device for input to the image processing system 126 may be generated by the input device or may be obtained by the input device, e.g. from another system or device. For example, the data for input to the image processing system 126 may be image data generated by a graphics processing unit (GPU).

Thus, it can be seen that methods described herein allow for determining whether data for input into a neural network layer has been altered since the data was first generated. Furthermore, methods described herein can reduce the risk of exposure of input data, output data, and/or data corresponding to the operations involved in the neural network (e.g. weights and/or biases) to a malicious party. The security of input and output data here is not limited to the inputs and outputs of the neural network as a whole but also applies to the inputs and outputs of individual neural network layers.

Although the computing systems 140, 162 of FIGS. 5 and 7 are shown as a single system (e.g. corresponding to a single device), it is to be appreciated that computing systems otherwise similar to the computing systems 140, 162 of FIGS. 5 and 7 may be implemented as distributed systems. For example, the image processing system 126 and the display processor 144 of FIG. 5 may be within different computing systems. Similarly, the image processing system 126 and the ISP 166 of FIG. 7 may be within different computing systems. An example of a distributed system for use with the methods herein is shown in FIG. 9, which is a schematic diagram of a system 182 which includes a first computing system 184 and a second computing system 186 that communicate with each other via a data communications network 188. For example, one data processing system such as the ISP 166 of FIG. 7 may be included in the first computing system 184, which in this example may be a digital camera. Another data processing system, such as the image processing system 126, may be included in the second computing system 186, which in this example may be a laptop computer (although this is merely an example). In this case, the image processing system 126 in the laptop computer may be configured to implement a super resolution neural network to upscale an image received from the ISP of the digital camera of the first computing system 184 as image data. The data communications network 188 may include private network links and/or public network links and may include a plurality of interconnected networks. The first and second computing systems 184, 186 may have integrated or externally-coupled wired networking capabilities. Alternatively, or in addition, the first and second computing systems 184, 186 may have integrated or externally-coupled wireless networking capabilities, using wireless telecommunications systems such as those using the Long-Term Evolution (LTE) standards. One or both of the first and second computing systems 184, 186 may be connected to one or more networks comprising servers, routers and other networking equipment that communicate using the Internet Protocol (IP). In this example, the third key may be securely sent to a data processing system of the laptop computer of the second computing system 186 from the ISP of the digital camera of the first computing system 184 through a first data channel different to a second data channel through which image data obtained by the camera is sent to the laptop computer. For example, the third key may be sent through a separate, secure data channel. This may reduce the risk of the third key being obtained by a malicious party. As explained with reference to the examples above, this may therefore reduce the risk of the input data and/or the weights of a neural network implemented by the image processing system 126 of the laptop computer being exposed.

Further examples are envisaged. For a given neural network layer of a neural network such as those described above, it may not be possible to process all the input data using the neural network layer in a single go. For example, a whole input image, or an input feature map resulting from the operation of one or more neural network layers on the input image, may have too large a size to be processed using a neural network layer in a single instance. Therefore, in some examples, the data for input into a neural network layer may be divided into portions to be processed, e.g. in turn or in parallel, using the neural network layer.

Applying this principle to the image processing system 126 of FIG. 4, the output data generated using the first neural network layer may be sent to the external storage 130 in portions and the version of the output data may be obtained from the external storage 130 in portions. The order in which portions of the output data are sent and portions of the version of the output data are obtained may be controlled by the DMA engine 132. In some examples, the order in which portions of the output data are sent to the external storage 130 may be the same order in which corresponding portions of the version of the output data are obtained from the external storage 130. In other examples, though, the order in which portions of the output data are sent to the external storage 130 may not be the same order in which corresponding portions of the version of the output data are obtained from the external storage 130. The image processing system 126, e.g. the NPU 128 of the image processing system 126, may be configured to determine whether a portion of the version of the output data differs from corresponding portion of the output data based on a location identifier. In this case, the location identifier identifies the corresponding portion of the output data within the output data. Therefore, the determination of whether the output data has been tampered with may be performed on a portion-by-portion basis in which a location identifier may be used to identify the portion of the output data for which this determination is being performed. In this example, the image processing system 126, e.g. the NPU 128, may be further configured to modify the key based on the location identifier and use the modified key to determine whether the portion of the version of the output data differs from the corresponding portion of the output data. In this way, the key used in the determination may differ for each portion of the output data providing additional difficultly for a malicious party to obtain each key associated with each portion of the output data. An example of this is discussed below with reference to FIG. 10.

Figure 10:
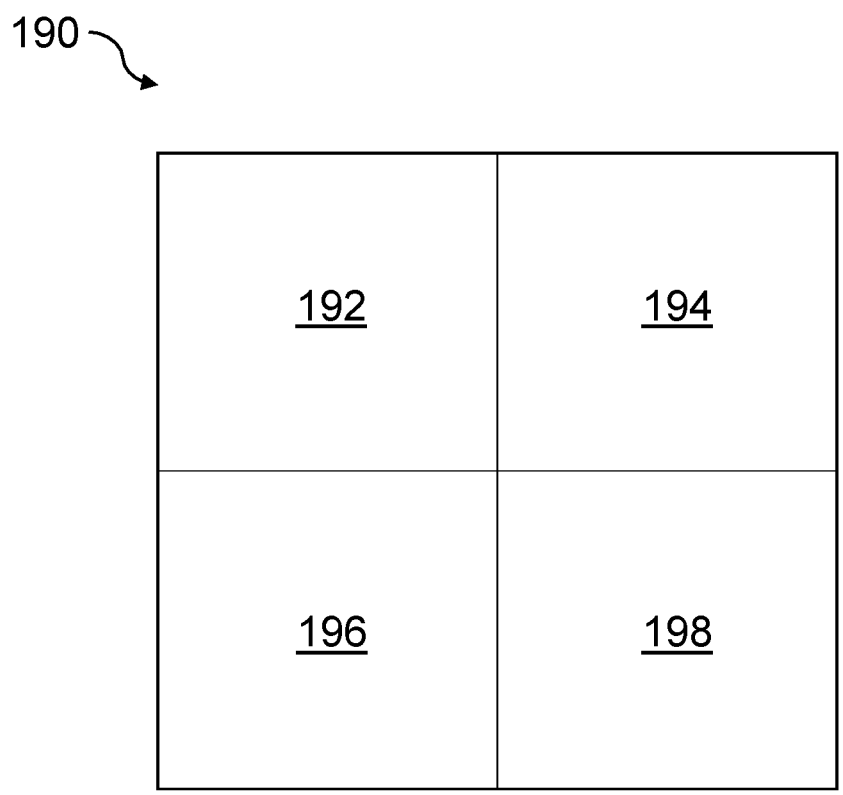
FIG. 10 is a schematic diagram of an image to be processed using an image processing system according to examples.

FIG. 10 is a schematic diagram of an image 190 to be processed using an image processing system according to examples herein, such as the image processing system 126 of FIG. 4 (described above). In some examples, the image 190 may be a feature map generated by processing data using one or more neural network layers. In other cases, though, the image 190 may include an array of pixels with respective pixel values indicative of a property (e.g. an intensity and/or colour) of a corresponding portion of a scene represented by the image. In this example, the image 190 includes four tiles: a top-left tile 192, a top-right tile 194, a bottom-left tile 196 and a bottom-right tile 198. Although not shown in FIG. 10, the regions of the image 190 represented by the four tiles may partially overlap. The image 190 may be represented by image data which may be divided into four portions, each portion of the image data representing one of the four tiles of the image 190. In this example, in order to explain the portion-by-portion processing, the image data representing the image 190 is the output data generated using the first neural network layer and the version of the output data represents a version of the image data for input into the second neural network layer as described above.

In this example, the location identifier may be a unique identifier identifying each of the tiles in the image 190. In a simple example where the image 190 is divided into four tiles, the location identifier may be a 2-bit binary number. For example, the portion of image data representing the top-left tile 192 may have a location identifier with a value of 00. The portion of the image data representing the top-right tile 194 may have a location identifier with a value of 01. The portion of the image data representing the bottom-left tile 196 may have a location identifier with a value 10 and the portion of the image data representing the bottom-right tile 198 may have a location identifier with a value of 11. In this way, the location identifier identifies the corresponding portion of the image data within the image data.

In this example, the key associated with the first neural network layer is modified based on the location identifier. For example, the location identifier value may be appended to the value of the key to generate a modified key for each tile of the image 190. In this way, for a given tile, the modified key associated with the given tile will be used to determine whether the portion of the version of the image data differs from the corresponding portion of the image data. In this example, the storage 130 of the image processing system 126 may still store the key, without any appended location identifier such that a single key is stored as opposed to four different keys, reducing the capacity requirements of the storage 130. In this case, the location identifier for a given tile is appended to the single key as and when the modified key for a given tile is required.

To understand this principle, this example considers a signature-based determination of whether the portion of the version of the image data differs from the corresponding portion of the image data. It should be understood, though, that the same principle may be applied when this determination is based on a decrypted portion of the version of the image data.

In this example, for a portion of the image data, a first signature is calculated based on this portion of the image data and the modified key generated by appending the location identifier for the given tile (for example the top-left tile 192) to the key associated with the first neural network layer. The storage 130 may then store the unmodified key and the first signature. The portion of the image data may be sent to the external storage 136 via the interface 134. This may be controlled by the DMA engine 132. When a corresponding portion of the version of the image data representing the given tile of the version of the image (for example the top-left tile of the version of the image) is obtained from the external storage 136 using the DMA engine 132, the matching location identifier can be appended to the key obtained from storage 130 to recreate the modified key. The NPU 128 of the image processing system 126 is configured to calculate a second signature based on the recreated modified key and the portion of the version of the image data such that the NPU 128 may determine whether the second signature is equal to the first signature. In this way, the examples described herein may be applied on a portion-by-portion basis. In an alternative embodiment, a separate key (and, in some examples, a separate signature) may be generated for each tile of the image 190 providing variability in the keys generated for each tile.

Further examples are envisaged. For example, although the first and second neural network layers are referred to in the singular in examples described herein, it is to be understood that either or both of the first and second neural network layers may be a fusion of a plurality of neural network layers, such that processing a neural network layer as described above may actually involve the processing of multiple layers. For example, the NPU 128 of the image processing system 126 in FIG. 4 may be configured to generate output data by processing input data using at least one further neural network layer before the first neural network layer such that the output data is the output of the processing of multiple layers. This may mean that the determination of whether data generated by a neural network layer has been tampered with before input into a subsequent neural network layer may not be performed in between every layer but may instead be applied at stages, between groups of layers. In another non-limiting example, it is to be understood that either or both of the first and second neural network layers may be a sub-unit of a layer. This may be the case for particularly large neural network layers where the at least one processor of the data processing system may not have the capacity to implement a whole layer at a given time.

In examples above, output data is generated using a first neural network layer and a key associated with the first neural network is generated. However, it is to be appreciated that in some cases, output data may be generated using at least a portion of a neural network layer, e.g. less than all of the neural network layer. In such cases, the key may be associated with at least the portion of the neural network layer. For example, the output data 101 of FIG. 1 may be generated using a portion of the first neural network layer 104, and a key may be generated, which is associated with the portion of the first neural network layer 104. Such cases may involve generating a plurality of sets of output data, each associated with a different respective portion of a neural network layer, e.g. the first neural network layer. A plurality of sets of keys may in turn be generated, each associated with a different respective portion of the neural network layer.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A data processing system comprising:
   storage; and
   at least one processor to:
   generate first output data using at least a portion of a first neural network layer;
   generate a key associated with at least the portion of the first neural network layer;
   obtain the key from the storage;
   obtain a version of the first output data for input into a second neural network layer;
   using the key, determine whether the first output data generated using the first neural network layer has been tampered with or corrupted, wherein said determining comprises determining whether the version of the first output data differs from the first output data; and
   in response to determining that the version of the first output data is the same as the first output data:
   inputting the version of the first output data into the second neural layer; and
   processing the version of the first output data using the second neural network layer to generate second output data.

2. The data processing system of claim 1, wherein the storage is local storage of the data processing system, and the at least one processor is operable to:
   send the first output data to external storage, external to the data processing system, for storage; and
   obtain the version of the first output data from the external storage.

3. The data processing system of claim 1, wherein the storage is solely accessible by the at least one processor of the data processing system.

4. The data processing system of claim 1, wherein the at least one processor is operable to:
   calculate a first signature based on the key and the first output data;
   store the first signature in the storage;
   obtain the first signature from the storage; and
   calculate a second signature based on the key and the version of the first output data, wherein to determine whether the version of the first output data differs from the first output data, the at least one processor is operable to determine whether the second signature is equal to the first signature.

5. The data processing system of claim 1, comprising:
   an encryption engine to encrypt the first output data using the key; and
   a decryption engine to decrypt the version of the first output data using the key to generate a decrypted version of the first output data, wherein the at least one processor is operable to determine whether the version of the first output data differs from the first output data based on the decrypted version of the first output data.

6. The data processing system of claim 1, wherein in response to determining that the version of the first output data differs from the first output data, the at least one processor is operable to generate data representing an indication that the version of the first output data differs from the first output data.

7. The data processing system of claim 1, wherein the data processing system is a first data processing system, the key is a first key and the at least one processor is operable to:
   generate a second key, wherein the second key is associated with the second neural network layer;
   send the second output data to a second data processing system; and
   send the second key to the second data processing system.

8. The data processing system of claim 7, comprising an encryption engine to encrypt the second output data using the second key before sending the second output data to the second data processing system.

9. The data processing system of claim 7, wherein:
   the second key is sent to the second data processing system through a first data channel different to a second data channel through which the second output data is sent to the second data processing system; or
   the second key is sent to the second data processing system using a shared storage accessible to both the first data processing system and the second data processing system.

10. The data processing system of claim 1, wherein the data processing system is a first data processing system, the key is a first key and the at least one processor is operable to:
    obtain a third key from a third data processing system, wherein the third key is associated with input data for input into at least the portion of the first neural network layer;
    obtain a version of the input data for input into at least the portion of the first neural network layer; and
    using the third key, determine whether the version of the input data differs from the input data.

11. The data processing system of claim 10, comprising a decryption engine to decrypt the version of the input data using the third key to generate a decrypted version of the input data, wherein the at least one processor is operable to determine whether the version of the input data differs from the input data based on the decrypted version of the input data.

12. The data processing system of claim 10, wherein:
    in response to determining that the version of the input data is the same as the input data, the at least one processor is operable to process the version of the input data using at least the portion of the first neural network layer; or
    in response to determining that the version of the input data differs from the input data, the at least one processor is operable to generate data representing an indication that the version of the input data differs from the input data.

13. The data processing system of claim 1, wherein the at least one processor is operable to determine whether a portion of the version of the first output data differs from a corresponding portion of the first output data based on a location identifier, wherein the location identifier identifies the corresponding portion of the first output data within the first output data.

14. The data processing system of claim 13, wherein the at least one processor is operable to:
modify the key based on the location identifier to generate a modified key; and
use the modified key to determine whether the portion of the version of the first output data differs from the corresponding portion of the first output data.

15. The data processing system of claim 1, wherein the data processing system is an image processing system, the first neural network layer and the second neural network layer are respective layers of a convolutional neural network, data input into the convolutional neural network represents an image, the first output data is an output feature map and the version of the first output data is an input feature map.

16. The data processing system of claim 1, wherein the at least one processor is operable to at least one of:
apply a lossless compression to the first output data; or
apply a lossy compression to the first output data, wherein the key is generated after the lossy compression of the first output data.

17. The data processing system of claim 1, wherein the at least one processor is at least one processor of a neural processing unit (NPU) of the data processing system and the storage is solely accessible by the NPU.

18. A method comprising:
generating first output data using at least a portion of a first neural network layer;
generating a key associated with at least the portion of the first neural network layer;
storing the key in storage;
obtaining the key from the storage;
obtaining a version of the first output data for input into a second neural network layer;
using the key, determining whether the first output data generated using the first neural network layer has been tampered with or corrupted, wherein said determining comprises determining whether the version of the first output data differs from the first output data; and
in response to determining that the version of the first output data is the same as the first output data:
inputting the version of the first output data into the second neural layer; and
processing the version of the first output data using the second neural network layer to generate second output data.

19. The method of claim 18, wherein the method comprises at least one of:
calculating a first signature based on the key and the first output data;
storing the first signature in the storage;
obtaining the first signature from the storage; and
calculating a second signature based on the key and the version of the first output data, wherein determining whether the version of the first output data differs from the first output data comprises determining whether the second signature is equal to the first signature; or
encrypting the first output data using the key; and
decrypting the version of the first output data using the key, wherein it is determined whether the version of the first output data differs from the first output data based on the decrypted version of the first output data.

20. The method of claim 18, wherein the method is implemented by a first data processing system, the key is a first key and the method comprises:
obtaining a second key from a second data processing system, wherein the second key is associated with input data for input into at least the portion of the first neural network layer;
obtaining a version of the input data for input into at least the portion of the first neural network layer; and
using the second key, determining whether the version of the input data differs from the input data,
wherein the second data processing system is a data processing system of an input device, wherein the input device comprises at least one of:
one or more sensors to obtain sensor data and send the sensor data to the first data processing system; and
a decoder to output decoded data to the first data processing system.

* * * * *